(12) United States Patent
Saliga et al.

(10) Patent No.: US 10,260,576 B2
(45) Date of Patent: Apr. 16, 2019

(54) VEHICLE TRANSMISSION HYDRAULIC CIRCUIT FILL TIME LEARN

(71) Applicants: Nathan J Saliga, Clarkson, MI (US); Rahul Rangarajan, Rochester Hills, MI (US); Jeffrey E Ross, Ortonville, MI (US)

(72) Inventors: Nathan J Saliga, Clarkson, MI (US); Rahul Rangarajan, Rochester Hills, MI (US); Jeffrey E Ross, Ortonville, MI (US)

(73) Assignee: FCA US LLC, Auburn Hills, MI (US)

(*) Notice: Subject to any disclaimer, the term of this patent is extended or adjusted under 35 U.S.C. 154(b) by 91 days.

(21) Appl. No.: 15/669,123

(22) Filed: Aug. 4, 2017

(65) Prior Publication Data

US 2018/0058520 A1 Mar. 1, 2018

Related U.S. Application Data

(60) Provisional application No. 62/381,888, filed on Aug. 31, 2016.

(51) Int. Cl.
*F16D 25/062* (2006.01)
*F16D 48/06* (2006.01)
(Continued)

(52) U.S. Cl.
CPC ......... *F16D 48/066* (2013.01); *F16D 25/062* (2013.01); *F16D 25/14* (2013.01);
(Continued)

(58) Field of Classification Search
CPC ......... Y10T 477/69362; Y10T 477/753; Y10T 477/78; Y10T 477/653; B60W 30/194; B60W 2710/021; B60W 2510/0216; B60W 2510/0638; B60W 2510/107; F16D 48/066; F16D 2500/5014; F16D 2500/304; F16D 2500/3067; F16D 2500/308;
(Continued)

(56) References Cited

U.S. PATENT DOCUMENTS 5,456,647 A * 10/1995 Holbrook ............... F16H 61/061
477/154
5,853,076 A * 12/1998 McKee ................... F16D 48/06
192/85.63

(Continued)

*Primary Examiner* — Roger L Pang
(74) *Attorney, Agent, or Firm* — Ralph E. Smith

(57) ABSTRACT

A system for controlling transmission shifting includes a controller that receives a shift request signal and determines if a clutch has been unapplied for more than a predetermined time. With a yes determination, a maximum fill time value for hydraulic fluid to be applied to a clutch control circuit is determined, the maximum fill time value being a function of time the clutch has been unapplied and temperature. A signal indicative of an amount of engine RPM flare after the transmission executes the requested shift is received and a modified maximum fill time value is determined as a function of this flare. The modified maximum fill time value is stored as a replacement for the maximum fill time value for use with a subsequent transmission shifts using this clutch, and reduces an amount of air in the control circuit and an amount of flare with subsequent transmission shifts.

8 Claims, 5 Drawing Sheets

(51) Int. Cl.
*F16D 48/02* (2006.01)
*B60W 30/194* (2012.01)

(52) U.S. Cl.
CPC ... *B60W 30/194* (2013.01); *B60W 2510/0216* (2013.01); *B60W 2510/0638* (2013.01); *B60W 2510/107* (2013.01); *B60W 2710/021* (2013.01); *F16D 2500/1026* (2013.01); *F16D 2500/1045* (2013.01); *F16D 2500/10412* (2013.01); *F16D 2500/304* (2013.01); *F16D 2500/308* (2013.01); *F16D 2500/3025* (2013.01); *F16D 2500/3067* (2013.01); *F16D 2500/5014* (2013.01); *F16H 2200/006* (2013.01); *Y10T 477/653* (2015.01); *Y10T 477/69362* (2015.01); *Y10T 477/753* (2015.01); *Y10T 477/78* (2015.01)

(58) Field of Classification Search
CPC ..... F16D 2500/3025; F16D 2500/1045; F16D 2500/10412; F16D 2500/1026
USPC .................................................. 701/59, 60
See application file for complete search history.

(56) References Cited

U.S. PATENT DOCUMENTS

| | | | |
|---|---|---|---|
| 5,928,108 A | 7/1999 | Takiguchi | |
| 6,093,133 A | 7/2000 | Danielsen et al. | |
| 6,579,207 B2 | 6/2003 | Horiguchi | |
| 6,929,583 B2* | 8/2005 | Ayabe | F16H 61/061 477/109 |
| 7,043,347 B2* | 5/2006 | Inoue | F16H 61/061 475/116 |
| 8,216,111 B2* | 7/2012 | Pruski | F16H 61/061 477/143 |
| 9,534,646 B2* | 1/2017 | Cho | F16D 48/06 |

* cited by examiner

| Gear | Clutch/Brake | | | | |
|---|---|---|---|---|---|
| | A | B | C | D | E |
| 1st | ON | ON | ON | | |
| 2nd | ON | ON | | | ON |
| 3rd | | ON | ON | | ON |
| 4th | | ON | | ON | ON |
| 5th | | ON | ON | ON | |
| 6th | | | ON | ON | ON |
| 7th | ON | | ON | ON | |
| 8th | ON | | | ON | ON |
| Rev | ON | ON | | ON | |
| Park/Neutral | ON | ON | | | |

| Table 1: 1st Shift Learning Table | | | | | |
|---|---|---|---|---|---|
| Integrated RPM Flare on Clutch Apply | 0 | 10 | 50 | 100 | 500 |
| Boost Time Addition | -5 | 5 | 10 | 15 | 20 |

*FIG - 4A*

| Table 2: Boost Adapt | | | | | | |
|---|---|---|---|---|---|---|
| Time Unapplied | | 200 | 600 | 1200 | 2000 | 10000 |
| Temp | -30 | | | | | |
| | -10 | | | | | |
| | 0 | | | | | |
| | 10 | | | | | |
| | 20 | | | | | |
| | 40 | | | | | |
| | 60 | +15 | | | | |
| | 100 | | | | | |

*FIG - 4B*

| Table 3: Boost Adapt Multiplier |||||||||
|---|---|---|---|---|---|---|---|---|
| Shift Number | | 1 | 2 | 3 | 4 | 5 | 6 | 7 | 8 |
| Temp | -30 | | | | | | | | |
| | -10 | | | | | | | | |
| | 0 | | | | | | | | |
| | 10 | | | | | | | | |
| | 20 | | | | | | | | |
| | 40 | | | | | | | | |
| | 60 | | | | | | | | |
| | 100 | | | | | | | | |

FIG - 4C

| Table 4: Learning Table ||||||
|---|---|---|---|---|---|
| Integrated RPM Flare on Clutch Apply | 0 | 10 | 50 | 100 | 500 |
| Filter Modifier | 0.9 | 1.1 | 1.25 | 1.5 | 2 |

FIG - 4D

VEHICLE TRANSMISSION HYDRAULIC CIRCUIT FILL TIME LEARN

CROSS-REFERENCE TO RELATED APPLICATIONS

This application claims benefit of U.S. Provisional Application Ser. No. 62/381,888 filed on Aug. 31, 2016. The disclosure of the above application is incorporated herein by reference in its entirety.

FIELD

The present application relates generally to automatic transmissions for vehicles and, more particularly, to a transmission fill time learn and adaptation for hydraulic circuits of an automatic transmission based on a period of time of clutch deactivation.

BACKGROUND

In today's automatic transmissions, a series of clutches or friction elements typically provide a means for application and release of separate members to and from each other during the flow of power through the transmission. These clutches thereby constitute the means by which gears within the transmission are selectively engaged or disengaged typically from either the engine crankshaft or the transmission case. To apply each of these clutches, an electronically controlled hydraulic actuating device, such as a solenoid actuated valve, is often used. There is typically one valve for each clutch. Each of these valves control fluid flow to a respective clutch apply cavity or equivalent arrangement. The flow of fluid into such a clutch apply cavity results in the application or engagement of that clutch. Fluid is typically provided to such a clutch apply cavity from the transmission's fluid pump or other pressurized fluid providing means. This pump provides the required pressurization to allow fluid flow into the clutch apply cavity. Fluid flow is enabled by the opening of the solenoid actuated valve in response to a command or control signal received by the solenoid from an electronic control system.

While the vehicle engine is running, the transmission fluid pump typically maintains fluid within the transmission fluid circuits up to a predetermined level without significant trapped air. When the vehicle engine is turned off, the pump stops pumping and the fluid level within the transmission fluid circuits can drain and drop below this predetermined level. This fluid is often replaced by air. When the engine is subsequently turned back on, the air in the clutch control circuits may not be purged until after the first and/or subsequent applications of that clutch in a shift or shifts of the transmission.

As a result, if the gear shifted into occurs before the air is purged in the respective applying clutch circuit, then additional fluid must replace or compress this air before clutch application can occur. If additional fluid to the respective clutch element is supplied at the lower duty cycle flowrate, then the overall time required to apply the clutch element can be significantly increased. This, in effect, can create a control time lag that can affect shift time and can potentially be perceived by a vehicle operator. Thus, while such shift control systems work well for their intended purpose, there remains a desire for improvement in the relevant art.

SUMMARY

In accordance with one example aspect of the invention, a system for controlling shifting of a transmission of a motor vehicle is provided. In one exemplary implementation, the system includes a controller and a transmission including a clutch and a clutch apply circuit having a clutch apply cavity housing a clutch apply piston, where the piston and cavity are in fluid communication with a source of pressurized hydraulic fluid configured to be selectively applied to the cavity thereby moving the piston and applying the clutch to effect shifting of the transmission. The controller, in one exemplary implementation, is configured to: receive a signal indicative of a request for the transmission to execute a shift; determine if the clutch has been unapplied for more than a predetermined period of time; based on determining that the clutch has been unapplied for more than the predetermined period of time, determine a maximum fill time value for the pressurized hydraulic fluid to be applied to the piston to move the clutch to a kiss point, where the maximum fill time value is obtained from a set of fill time reference values that are a function of an amount of time the clutch has been unapplied and a temperature of the transmission; receive a signal indicative of an amount of engine RPM flare after the transmission executes the requested shift using the maximum fill time value; determine a modified maximum fill time value as a function of the engine RPM flare; and store the modified maximum fill time value as a replacement for the maximum fill time value in the set of fill time reference values and for use with a subsequent transmission shift request using the same clutch. The modified maximum fill time value is configured to reduce an amount of air in the hydraulic circuit and an amount of engine RPM flare associated with subsequent transmission shifts using the same clutch.

In some implementations, determining a modified maximum fill time value as a function of the amount of engine RPM flare includes: integrating the received signal indicative of the amount of engine RPM flare to determine an integrated flare control value indicative of an amount of time and energy associated with the amount of engine RPM flare; obtaining a fill time addition value from a first set of learning reference values that are a function of the integrated flare control value; and adding the obtained fill time addition value to the stored modified maximum fill time value in the set of fill time reference values for use with a subsequent shift using the same clutch when the clutch has been unapplied for more than the predetermined period of time, such that the stored modified maximum fill time value is continuously learned for subsequent shifts using the same clutch over an operational life of an associated vehicle.

In some implementations, based on the controller determining that the clutch has been unapplied for less than the predetermined period of time, the controller is configured to: determine a fill time value multiplier for the modified maximum fill time value currently stored in the set of fill time reference values, the fill time value multiplier being a function of temperature of the transmission and a number of shifts executed using the clutch during a current run cycle of the transmission and obtained by the controller from a stored set of fill time multiplier reference values.

In some implementations, the controller is further configured to: multiple the modified maximum fill time value currently stored in the set of fill time reference values by the determined fill time value multiplier to determine an adjusted maximum fill time value; and store the adjusted maximum fill time value as a replacement for the modified maximum fill time value currently stored in the set of fill time reference values such that the adjusted maximum fill time value is continuously learned for subsequent shifts using the same clutch over an operational life of an associated vehicle. In some implementations, the determined fill time value multiplier is a number between zero and one and is configured to decay increased fill time for the hydraulic circuit over the course of subsequent shifts.

In some implementations, the controller is further configured to command application of the pressurized fluid to the clutch apply circuit using the adjusted maximum fill time value to execute the desired shift using the clutch.

In some implementations, the controller is configured to: receive a signal indicative of an amount of engine RPM flare based on the transmission executing the requested shift using the adjusted maximum fill time value; integrate the received signal indicative of the amount of engine RPM flare based on the transmission executing the requested shift using the adjusted maximum fill time value to determine another integrated flare control value; and obtain a filter modifier value from a second set of learning reference values that are a function of the another integrated flare control value.

In some implementations, controller is further configured to: multiply the obtained fill time value multiplier by the obtained filter modifier value and store the resultant value in the set of fill time multiplier reference values as a replacement for the obtained fill time value multiplier such that the stored set of fill time value multipliers are continually learned based on engine RPM flare associated with subsequent transmission shifts using the same clutch when this clutch has been unapplied for more than the predetermined period of time.

BRIEF DESCRIPTION OF DRAWINGS

FIG. 4A is an example shift learning table (Table 1) in accordance with the principles of the present application;

FIG. 4B is an example boost adapt table (Table 2) in accordance with the principles of the present application;

FIG. 4C is an example boost adapt multiplier table (Table 3) in accordance with the principles of the present application;

FIG. 4D is an example learning table (Table 4) in accordance with the principles of the present application.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Figure 1:
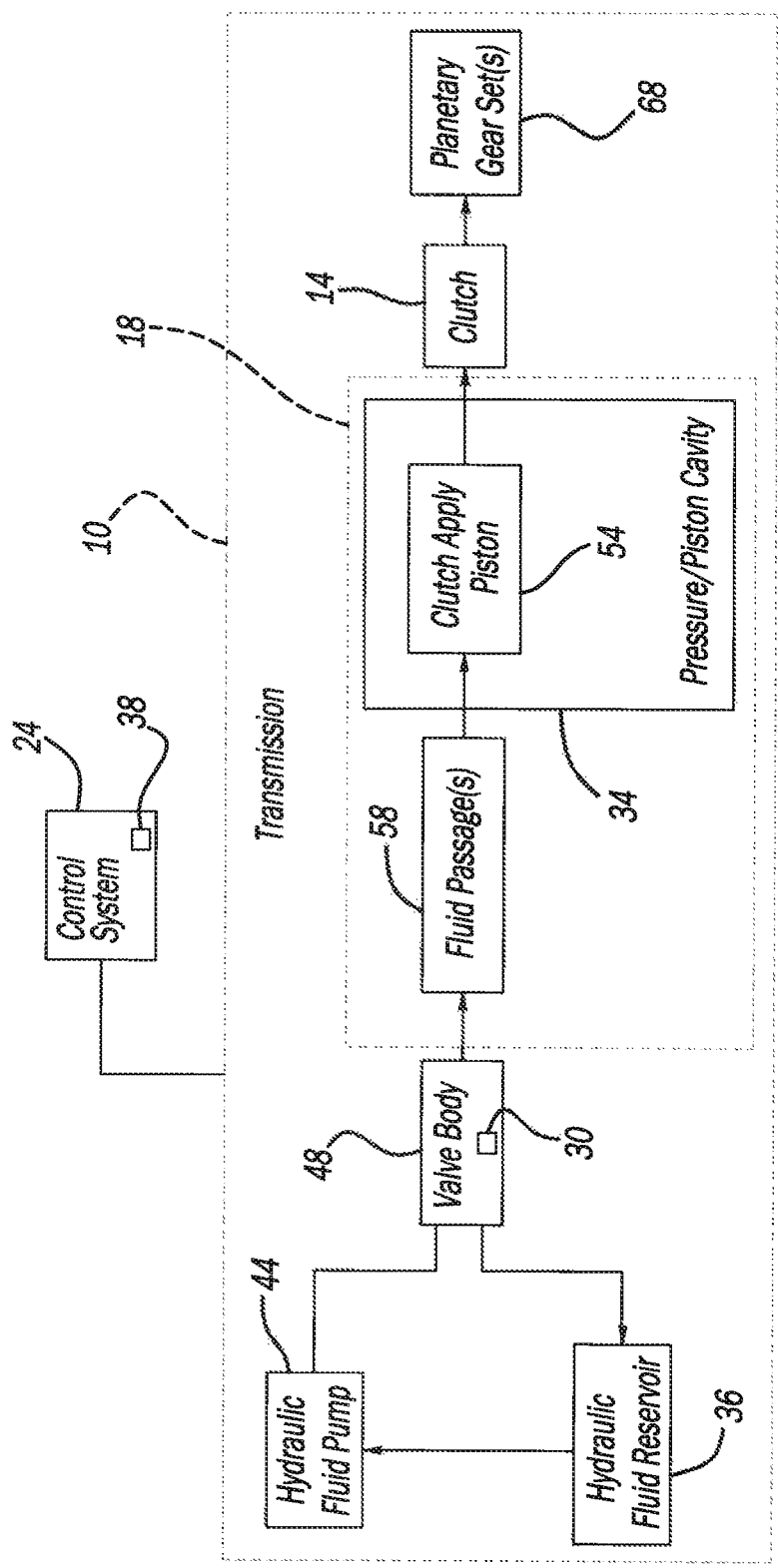
FIG. 1 is an example schematic block diagram of an example vehicle system including certain aspects of an associated transmission and a control system in accordance with the principles of the present application.
Figures 2, 3:
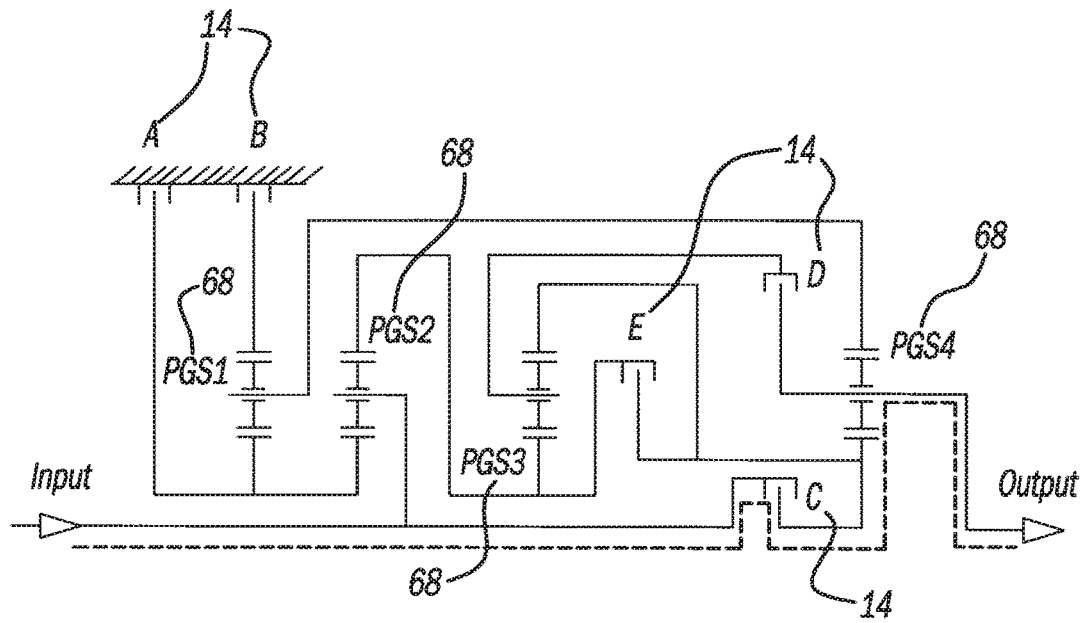
FIG. 2 is a partial schematic illustration of an architecture and example power flow for the example transmission of the vehicle system of FIG. 1 in accordance with the principles of the present application.
FIG. 3 is a table illustrating exemplary clutch application and shift sequences for the transmission of the vehicle system of FIG. 1 in accordance with the principles of the present application.

As briefly discussed above, today's vehicles often include a hydraulically controlled automatic transmission 10, such as an exemplary eight-speed transmission shown in FIGS. 1-3, with various clutch elements 14 that are hydraulically actuated via a hydraulic control circuit 18 and associated controller or electronic control system 24. The electronic control system 24 mentioned above typically includes a microcomputer or processor-based transmission control module capable of receiving input signals indicative of various vehicle operating conditions such as engine speed, torque converter turbine speed, transmission output shaft speed (vehicle speed), throttle angle position, brake application, predetermined hydraulic pressures, a driver selected gear or operating condition (PRNDL), engine coolant temperature and/or the ambient air temperature, for example.

Based on the information contained in these signals, the controller 24 generates commands or control signals for causing the actuation of each of the solenoid/actuated valves 30 of an associated valve body 48 which control the application and release of fluid pressure to and from the apply cavities 34 of the clutches or frictional units 14 of the transmission 10. Accordingly, the controller 24 is programmed to execute predetermined shift schedules stored in a memory 38 of the controller 24 through appropriate command signals to the solenoid-actuated valves 30.

In one example implementation, transmission fluid is supplied to the clutch apply cavity 30 from a fluid reservoir 36 in two stages. First, the fluid from a transmission pump 44 is supplied to the clutch element 14 by the solenoid actuated valve 30 in a high flow, large opening and high-pressure fashion to rapidly pre-fill and stroke a clutch apply piston 54 in cavity 34 through a clearance that is established when the clutch 14 is disengaged. This rapid fill rate or boost fill is maintained until the remaining piston clearance is nearly zero.

Next, the solenoid actuated valve 30 undergoes a duty cycle to cyclically allow the fluid to generate an average lower flowrate of fluid to the clutch apply cavity 34 than was provided by the first flowrate. This lower rate or stroke phase causes a softer application of the respective clutch element 14 than would otherwise be associated with the solenoid valve 30 in its previous high pressure command state and moves the clutch 14 to a kiss point which, for purposes of this application, is a point where the friction material is in contact with the friction plates and a first unit of torque is beginning to be transferred, and any further increase in pressure directly relates to an increase in transferred torque.

As discussed above, while the vehicle engine is running, the transmission fluid pump 44 typically maintains fluid within the transmission fluid circuits 18 (and fluid passages 58 and cavities 34 therein) up to a predetermined level without significant trapped air. When the vehicle engine is turned off, however, the pump 44 stops pumping and the fluid level within the transmission fluid circuits 18 may drain and drop below this predetermined level. This fluid is often replaced by air and when the engine is subsequently turned back on, and the air in the clutch hydraulic control circuits 18 may not be purged until after the first and/or subsequent applications of that clutch 14 in a shift or shifts.

As a result, if the transmission gear 64 shifted into occurs before the air is purged in the respective applying clutch circuit 18, then additional fluid must replace or compress this air before clutch 14 application will occur. This, in effect, creates a control time lag that typically affects shift time and is potentially perceived by a vehicle operator. In addition, engine RPM may flare in connection with such a shift scenario as a result of trapped air in the circuit 18 and/or the increased clutch 14 application time, which may also be perceived by the vehicle operator and/or occupants. Accordingly, techniques and associated control systems and methods are provided for learning the fill time needed for a first shift and subsequent shifts to account for air in the hydraulic circuit 18 and/or associated engine RPM flare. In one example implementation, the fill time is learned over the course of the vehicle's life and takes into account engine RPM flare from a previous shift.

Figure 5:
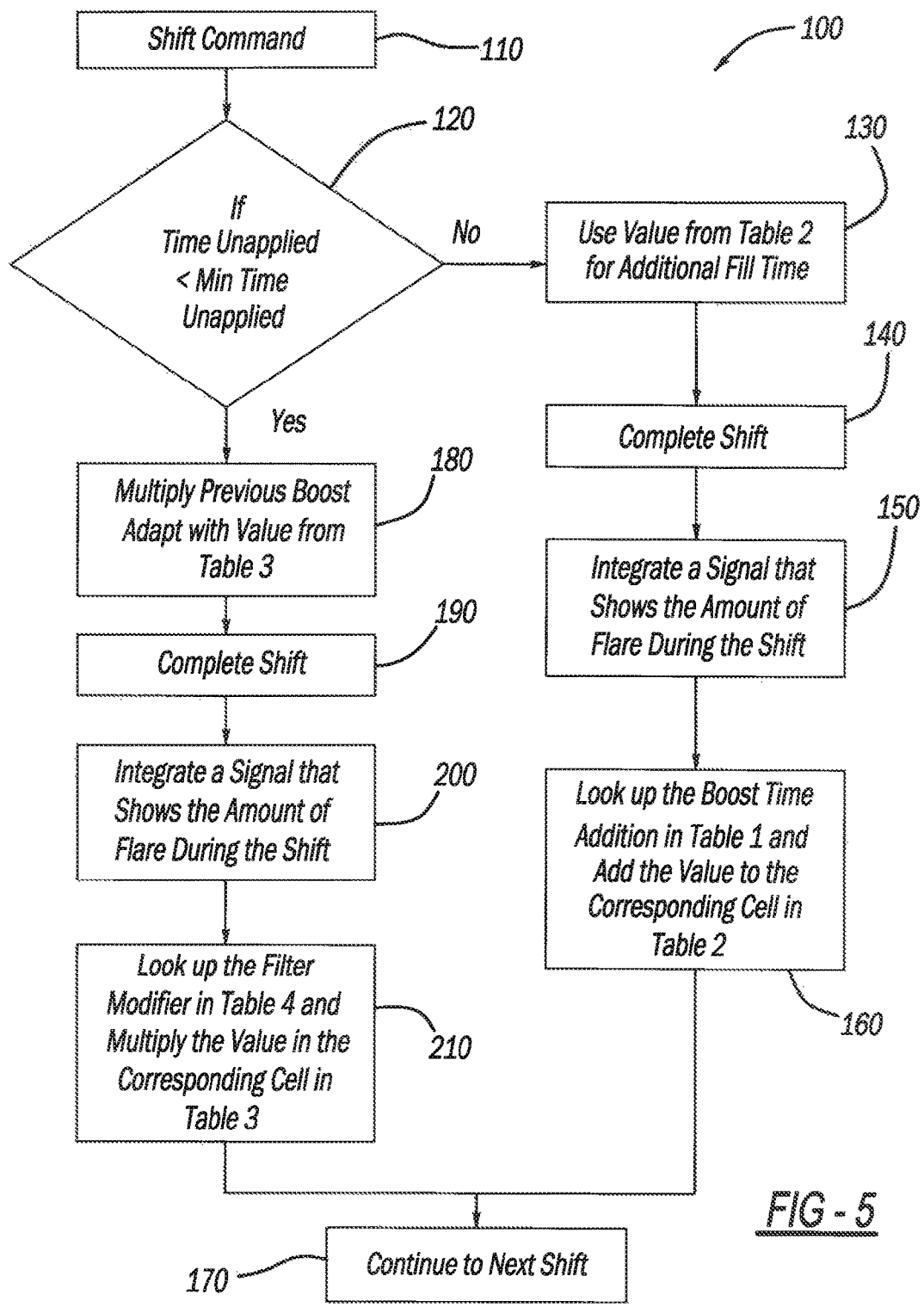
FIG. 5 is an example flow diagram of an example control technique in accordance with the principles of the present application.

With particular reference now to FIG. 5, an exemplary control technique 100 for the transmission control system of the present application will now be discussed in greater detail with reference to the example Tables 1-4 of corresponding FIGS. 4A-4D. This control technique 100 is, in the exemplary implementation illustrated, associated with the example eight speed transmission 10 as discussed above and generally shown in FIGS. 1 and 2, although it will be appreciated by the skilled artisan that the control technique 100 is applicable to other hydraulically controlled automatic transmissions having different structure and/or speeds.

Briefly, however, an exemplary transmission architecture and an example power flow for first gear of the eight speed transmission 10 is schematically shown in FIG. 2 and will be discussed with reference to FIG. 1. The example transmission 10 includes five clutches/brakes 14 (specifically also identified as A-E in FIG. 2) and four simple planetary gear sets 68 (specifically identified also as PGS1-PGS4 in FIG. 2), where different combinations of three clutches 14 are selectively engaged or activated to generate eight forward gears/speeds 64 and reverse, as shown for example in the table of FIG. 3. In one exemplary implementation, the clutches 14 (A-E) are electro-hydraulically controlled clutches, although one skilled in the art will appreciate that other controllable clutch or torque transfer device arrangements may be utilized in connection with the example eight speed transmission 10 or a transmission having more or less speeds.

Turning now back to control technique 100, at Block 110 in FIG. 5, the transmission controller (controller) 14 receives an input signal or signals indicative of a request for the transmission to execute a shift. This shift may, in one exemplary implementation, be any shift and/or may be a shift from sixth to fifth gear 64 and/or shifts from first to second or second to third gears 64.

The controller 24 then determines at Block 120 whether the clutch 14 that will need to be applied for the commanded shift has not been applied (i.e., has been unapplied) for less than a predetermined amount of time. If the answer is no, such as for the first shift after a shutdown, then the control technique 100 proceeds to Block 130. If the answer is yes, such that the subject clutch unapplied time is less than the predetermined minimum amount of time unapplied, then the technique 100 proceeds to Block 180, as shown in FIG. 5, and this aspect of the technique 100 will be discussed after a discussion below of Blocks 130-160, which follow the "no" path from Block 120.

At Block 130, the controller 24 utilizes a value from a look-up or reference table shown as exemplary Table 2 in FIG. 4B. This Table 2 is prefilled with calibrated values of boost adapt as a function of temperature and time the subject clutch 14 has been unapplied. As will be discussed in greater detail below, these calibrated values are then replaced or modified with learned values over the life of the vehicle.

The term boost adapt, as used above and herein, refers to a maximum fill rate r time of the hydraulic circuit 18 associated with the subject clutch 14 to get the clutch 14 to just before a kiss or trickle point. In other words, the solenoid is commanded to the high flow, high-pressure operation (discussed above) to rapidly fill the circuit 18 and move the piston such that the clutch element is just before the kiss point. This rapid fill or boost adapt can also be referred to generally as the fill time. The clutch 14 then goes through the stroke phase to get the rest of the way to the kiss point, as is known in the art. Thus, at Block 130, the controller 14 uses the time the clutch 14 has been unapplied and the temperature to obtain the fill time or boost adapt value for the subject clutch 14.

After filling the hydraulic circuit 18 for the boost adapt time determined in connection with Table 2, and thus completing the boost fill and stroke phases to move the clutch 14 to the kiss point, the requested shift is then completed at Block 140.

At Block 150, the controller 24 receives a signal indicative of the amount of engine RPM flare during the shift completed at Block 140. Engine RPM flare refers to, in general, the amount of engine RPM increase or movement in the "wrong direction" over or relative to the target gear ratio 64 for the shift. This signal is then integrated resulting in an integrated control value indicative of the time and energy associated with such flaring for the just completed shift.

At Block 160, the integrated control value or integrated flare on clutch apply value is utilized in connection with the look-up or reference Learning Table 1 of FIG. 4A to obtain the boost adapt time addition or modification for the next time the same shift (or a shift using the same clutch 14) is commanded in order to reduce or eliminate the engine RPM flare. This boost time addition or modification from Table 1 is applied to the corresponding cell of Table 2 so as to continually learn the values for Table 2 for subsequent shifts where the time of the clutch 14 being unapplied is greater than the predetermined minimum time unapplied.

For example, if the integrated flare control value was 100, then utilizing the value of 15 msec obtained from Table 1, the corresponding boost adapt time in Table 2 for the associated temperature (say 60 degrees) and clutch unapplied time (say 200 msec) would be increased by 15 msec. Then, the next shift for this aspect of the control technique 100 flowing from Block 120 would use this new value (i.e., the value increased by 15 msec in Table 2).

The control technique then continues to Block 170 and then to Blocks 110 and 120 with a next shift command received. At Block 120 in this example, the control technique 100 will continue, for explanation purposes, with an example where the clutch time unapplied is less than the predetermined minimum time unapplied such that the technique proceeds from Block 120 to Block 180.

At Block 180, the previous boost adapt value (e.g., from Table 2) in connection with filling the clutch circuit is multiplied by the boost adapt multiplier obtained from Table 3. As can be seen in Table 3, the boost adapt multiplier is a function of temperature and shift number and is a multiplier between zero and one configured to decay the increased boost time over the course of subsequent vehicle shifts. For example, when shifting again with the same clutch, a lower amount of boost adapt would generally be used (subject to decreasing engine RPM flare as discussed below) and thus the multiplier would be less than one and less than the previous multiplier. Thus, instead of the boost adapt time being the same for each shift, the boost adapt would decrease over time due to the multiplier being smaller with each subsequent shift, up to a steady fill time value associated with no flare.

After filling the hydraulic circuit 18 for the adjusted/modified boost adapt time determined in connection with Table 3 as discussed above, and thus completing the boost fill and stroke fill phases to move the clutch 14 to the kiss point, the requested shift is completed at Block 190. At Block 200, the controller 24 receives a signal indicative of the amount of engine RPM flare, if any, during the shift completed at Block 190. This signal is then integrated in the same manner as discussed above in connection with Block 150.

The technique 100 continues to Block 210 of FIG. 5, where the controller 24 references look-up or reference Learning Table 4 of FIG. 4D, where the integrated flare control value determined in connection with Block 200 is used to obtain a filter modifier from Table 4 to modify the value in the corresponding cell in Table 3 of FIG. 4C, noting that the cell values of Table 4 and the other tables, where applicable, are example values for discussion and explanation purposes only.

For example, the values from Table 4 are used to continually learn or adjust the corresponding cell values in Table 3 based on the amount of the integrated flare value determined in Block 200. As discussed above, the values in Table 3 will reduce the boost adapt time taking into account that any air in the circuit 18 should be purged more with each shift and thus the circuit 18 would include more fluid and require less boost time with each successive shift. However, if for some reason there is more engine RPM flare than expected at this point of the control technique 100, such as a value greater than the example value of zero in Table 4, this step in the process provides for increasing and/or adjusting/correcting the value in Table 3 to provide for less of a reduction in the boost time less by increasing the value of the multiplier in Table 3.

The control technique 100 then continues to Block 170 and then to Blocks 110 and 120 upon receiving the next shift command. Upon receipt of this next shift command, the control technique 100 will continue from Block 120 to one of Block 3 or Block 8 and repeat in the manners discussed above, where the values for Tables 2 and 3 are learned and adjusted also in the manner discussed above.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A system for controlling shifting of a vehicle transmission, the system comprising:
a transmission including a clutch and a clutch apply circuit having a clutch apply piston, the piston being in fluid communication with a source of pressurized hydraulic fluid configured to be selectively applied to the clutch apply circuit thereby moving the piston and applying the clutch to effect shifting of the transmission; and
a controller configured to:
receive a signal indicative of a request for the transmission to execute a shift;
determine if the clutch has been unapplied for more than a predetermined period of time;
based on determining that the clutch has been unapplied for more than the predetermined period of time, determine a maximum fill time value for the pressurized hydraulic fluid to be applied to the piston to move the clutch to a kiss point, the maximum fill time value being obtained from a set of fill time reference values that are a function of an amount of time the clutch has been unapplied and a temperature of the transmission;
receive a signal indicative of an amount of engine RPM flare after the transmission executes the requested shift using the maximum fill time value; and
determine a modified maximum fill time value as a function of the engine RPM flare, and store the modified maximum fill time value as a replacement for the maximum fill time value in the set of fill time reference values and for use with a subsequent transmission shift request using the same clutch;
wherein the modified maximum fill time value is configured to reduce an amount of air in the hydraulic circuit and an amount of engine RPM flare associated with subsequent transmission shifts using the same clutch.

2. The system of claim 1, wherein determining a modified maximum fill time value as a function of the amount of engine RPM flare includes:
integrating the received signal indicative of the amount of engine RPM flare to determine an integrated flare control value indicative of an amount of time and energy associated with the amount of engine RPM flare;
obtaining a fill time addition value from a first set of learning reference values that are a function of the integrated flare control value; and
adding the obtained fill time addition value to the stored modified maximum fill time value in the set of fill time reference values for use with subsequent shifts using the same clutch when the clutch has been unapplied for more than the predetermined period of time, such that the stored modified maximum fill time value is continuously learned for subsequent shifts using the same clutch over an operational life of an associated vehicle.

3. The system of claim 1, wherein based on the controller determining that the clutch has been unapplied for less than the predetermined period of time, the controller is configured to:
determine a fill time value multiplier for the modified maximum fill time value currently stored in the set of fill time reference values, the fill time value multiplier being a function of temperature of the transmission and a number of shifts executed using the clutch during a current run cycle of the transmission and obtained by the controller from a stored set of fill time multiplier reference values.

4. The system of claim 3, wherein the controller is further configured to:
multiply the modified maximum fill time value currently stored in the set of fill time reference values by the determined fill time value multiplier to determine an adjusted maximum fill time value; and store the adjusted maximum fill time value as a replacement for the modified maximum fill time value currently stored in the set of fill time reference values such that the adjusted maximum fill time value is continuously learned for subsequent shifts using the same clutch over an operational life of an associated vehicle.

5. The system of claim 4, wherein the controller is further configured to command application of the pressurized fluid to the clutch apply circuit using the adjusted maximum fill time value to execute the desired shift using the clutch.

6. The system of claim 4, wherein the determined fill time value multiplier is a number between zero and one and is configured to decay increased fill time for the hydraulic circuit over the course of subsequent shifts.

7. The system of claim 6, wherein the controller is configured to:

receive a signal indicative of an amount of engine RPM flare based on the transmission executing the requested shift using the adjusted maximum fill time value;

integrate the received signal indicative of the amount of engine RPM flare based on the transmission executing the requested shift using the adjusted maximum fill time value to determine another integrated flare control value; and obtain a filter modifier value from a second set of learning reference values that are a function of the another integrated flare control value.

8. The system of claim 7, wherein the controller is further configured to:

multiply the obtained fill time value multiplier by the obtained filter modifier value and store the resultant value in the set of fill time multiplier reference values as a replacement for the obtained fill time value multiplier such that the stored set of fill time value multipliers are continually learned based on engine RPM flare associated with subsequent transmission shifts using the same clutch when this clutch has been unapplied for more than the predetermined period of time.

* * * * *